(12) United States Patent
Tsai et al.

(10) Patent No.: US 10,628,106 B1
(45) Date of Patent: Apr. 21, 2020

(54) MULTIMEDIA INTERACTING SYSTEM AND MULTIMEDIA INTERACTING METHOD

(71) Applicant: INSTITUTE FOR INFORMATION INDUSTRY, Taipei (TW)

(72) Inventors: Kuel-Chien Tsai, Keelung (TW); Yu-Jung Cheng, Yilan County (TW); Hsien-Cheng Liao, Taipei (TW)

(73) Assignee: Institute For Information Industry, Taipei (TW)

( * ) Notice: Subject to any disclaimer, the term of this patent is extended or adjusted under 35 U.S.C. 154(b) by 27 days.

(21) Appl. No.: 16/202,112

(22) Filed: Nov. 28, 2018

(30) Foreign Application Priority Data

Nov. 1, 2018 (TW) .............................. 107138840 A

(51) Int. Cl.
*G06F 3/14* (2006.01)
(52) U.S. Cl.
CPC ...................................... *G06F 3/14* (2013.01)
(58) Field of Classification Search
CPC .. H04N 21/2387; H04N 21/84; G06F 16/252; G06F 1/1637; G06F 3/1423; G06F 16/176
See application file for complete search history.

(56) References Cited

U.S. PATENT DOCUMENTS

| | | | | |
|---|---|---|---|---|
| 2008/0109841 | A1* | 5/2008 | Heather | G06Q 30/02 725/32 |
| 2010/0003969 | A1* | 1/2010 | Isobe | H04M 3/533 455/412.1 |
| 2012/0167151 | A1* | 6/2012 | Cho | H04N 21/47202 725/93 |
| 2015/0181154 | A1* | 6/2015 | Lee | G11B 27/34 386/230 |

\* cited by examiner

*Primary Examiner* — Gerald Johnson
(74) *Attorney, Agent, or Firm* — CKC & Partners Co., LLC

(57) ABSTRACT

The present disclosure provides a multimedia interacting system. The multimedia interacting system comprises a first display device, a second display device, and a server. The server communicatively connects with the first display device and the second display device. The server is configured to receive a first playback time that the first display device plays a first tour video; obtain an unsheltered area associated with the first tour video based on the first playback time; obtain a second tour video corresponding to the unsheltered area; and transmit an interacting data to the first display device and the second display device if the second display device plays the second tour video.

20 Claims, 5 Drawing Sheets

MULTIMEDIA INTERACTING SYSTEM AND MULTIMEDIA INTERACTING METHOD

CROSS-REFERENCE TO RELATED APPLICATION

This application claims priority to Taiwan Application Serial Number 107138840, filed on Nov. 1, 2018, which is herein incorporated by reference.

BACKGROUND

Technical Field

The present disclosure relates to a multimedia system and method. More particularly, the present disclosure relates to a multimedia interacting system and method.

Description of Related Art

Usually, multiple videos are collected to a tour video set of a space guide system. Hence, techniques for editing videos are applied to build a virtual space system. Because there is no 3D model built for the video-editing techniques, it cannot be estimated for positions at respective virtual coordinates and virtual view sights and it cannot be determined whether users at different virtual positions can interact with each other or not. For example, in the virtual space system, it cannot be determined whether there is any obstacle between users or whether the interactive distance is so long that users cannot interact with each other.

In the existing virtual space system, it cannot be determined, by using video contents, whether users interact with each other or not. Accordingly, the problem of calculating the interactive range for multi-user should be solved. By using videos in the space guild system without applying the 3D image model, it can be confirmed quickly whether users are located at interactive virtual space or not.

SUMMARY

One aspect of the present disclosure is related to a multimedia interacting system includes a first display device, a second display device, and a server. The server is configured to communicate with the first display device and the second display device. The server is configured to receive a first video-playing time that the first display device plays a first tour video; obtain an unsheltered area associated with the first tour video according to the first video-playing time; obtain a second tour video corresponding to the unsheltered area; and transmit an interactive data to the first display device and the second display device when the second display device plays the second tour video.

Another aspect of the present disclosure is related to multimedia interacting method, the multimedia interacting method includes the following steps: receiving a first video-playing time that a first tour video is played by a first display device; obtaining an unsheltered area associated with the first tour video according to the first video-playing time; obtaining a second tour video corresponding to the unsheltered area; and transmitting an interactive data to the first display device and the second display device when the second display device plays the second tour video.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
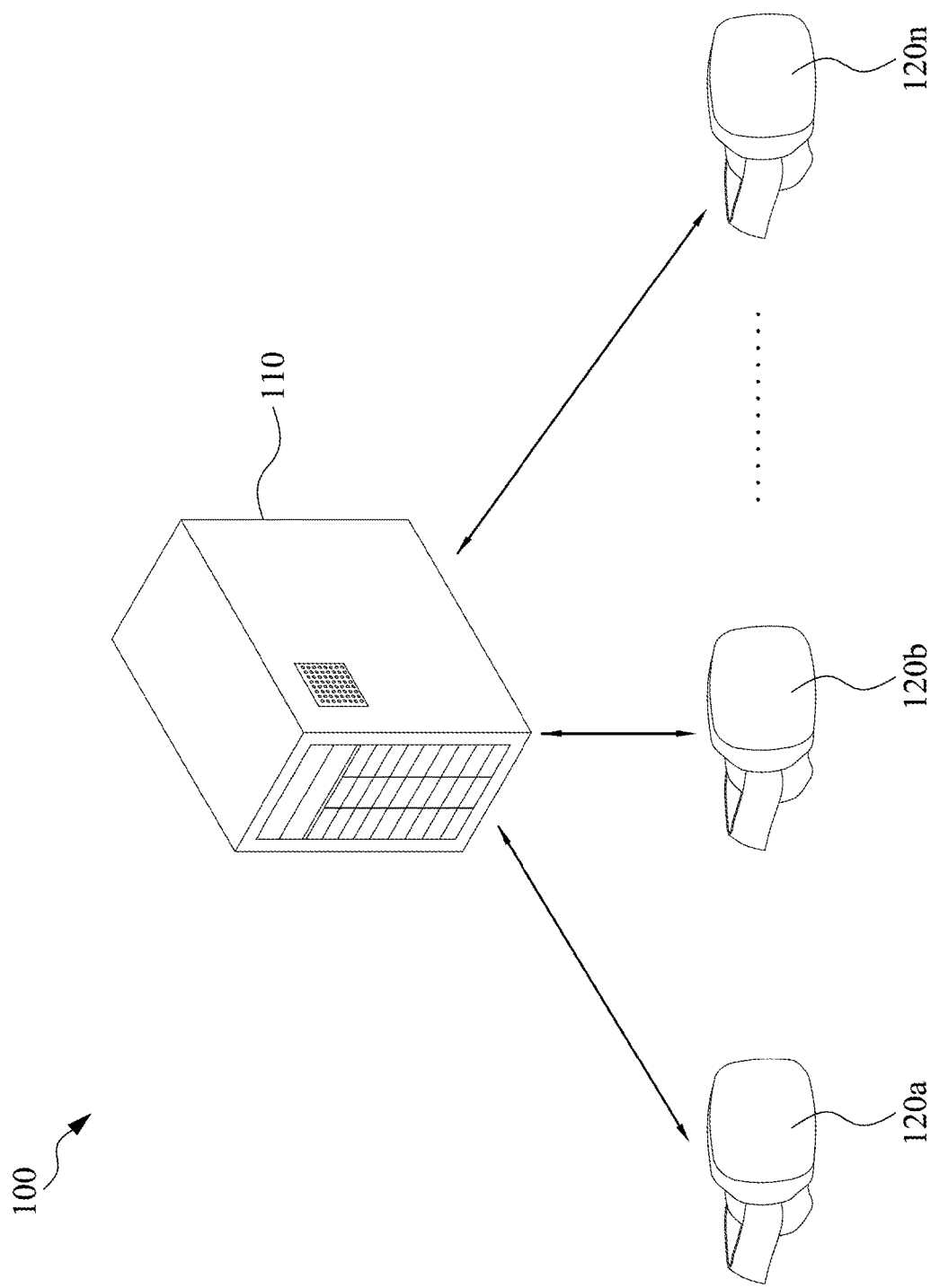
FIG. 1 is a diagram illustrating a multimedia interacting system in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Moreover, "electrically connect" or "connect" can further refer to the interoperation or interaction between two or more elements.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

It will be understood that, in the description herein and throughout the claims that follow, words indicating direction used in the description of the following embodiments, such as "above," "below," "left," "right," "front" and "back," are directions as they relate to the accompanying drawings. Therefore, such words indicating direction are used for illustration and do not limit the present disclosure.

It will be understood that, in the description herein and throughout the claims that follow, unless otherwise defined, all terms (including technical and scientific terms) have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any element in a claim that does not explicitly state "means for" performing a specified function, or "step for" performing a specific function, is not to be interpreted as a "means" or "step" clause as specified in 35 U.S.C. § 112(f). In particular, the use of "step of" in the claims herein is not intended to invoke the provisions of 35 U.S.C. § 112(f).

Please referring to FIG. 1, FIG. 1 shows a diagram illustrating a multimedia interacting system 100 in accordance with some embodiments of the present disclosure. As shown in FIG. 1, the multimedia interacting system 100 includes a server 110 and a plurality of display device 120a~120n. The display device 120a~120n may be but not limited to a head mounted device suitable for the virtual reality techniques, displays, monitors, etc. The display device 120a~120n communicate with the server 110. In one embodiment, the display device 120a~120n connect with a host device (not shown) of the local site. The host device is communicated with the server 110 through wired communications or wireless communications in order to connect to the server 110. The display device 120a~120n download/upload the data from/to the server 110. The display device 120a~120n acquire data from the server 110 through the host device.

The display device 120a~120n may be disposed in the same or different physical locations respectively. For example, the display device 120a~120n are disposed at different rooms of the same building respectively so that many users can operate the display device 120a~120n.

There are multiple tour videos stored in the server 110. The display device 120 shows the tour video downloaded from the server 110. The tour videos can be but not limited to the real scene videos recorded previously, such as recorded along different routes in the British Museum. The illustration for building the tour videos shows as following.

Figure 2:
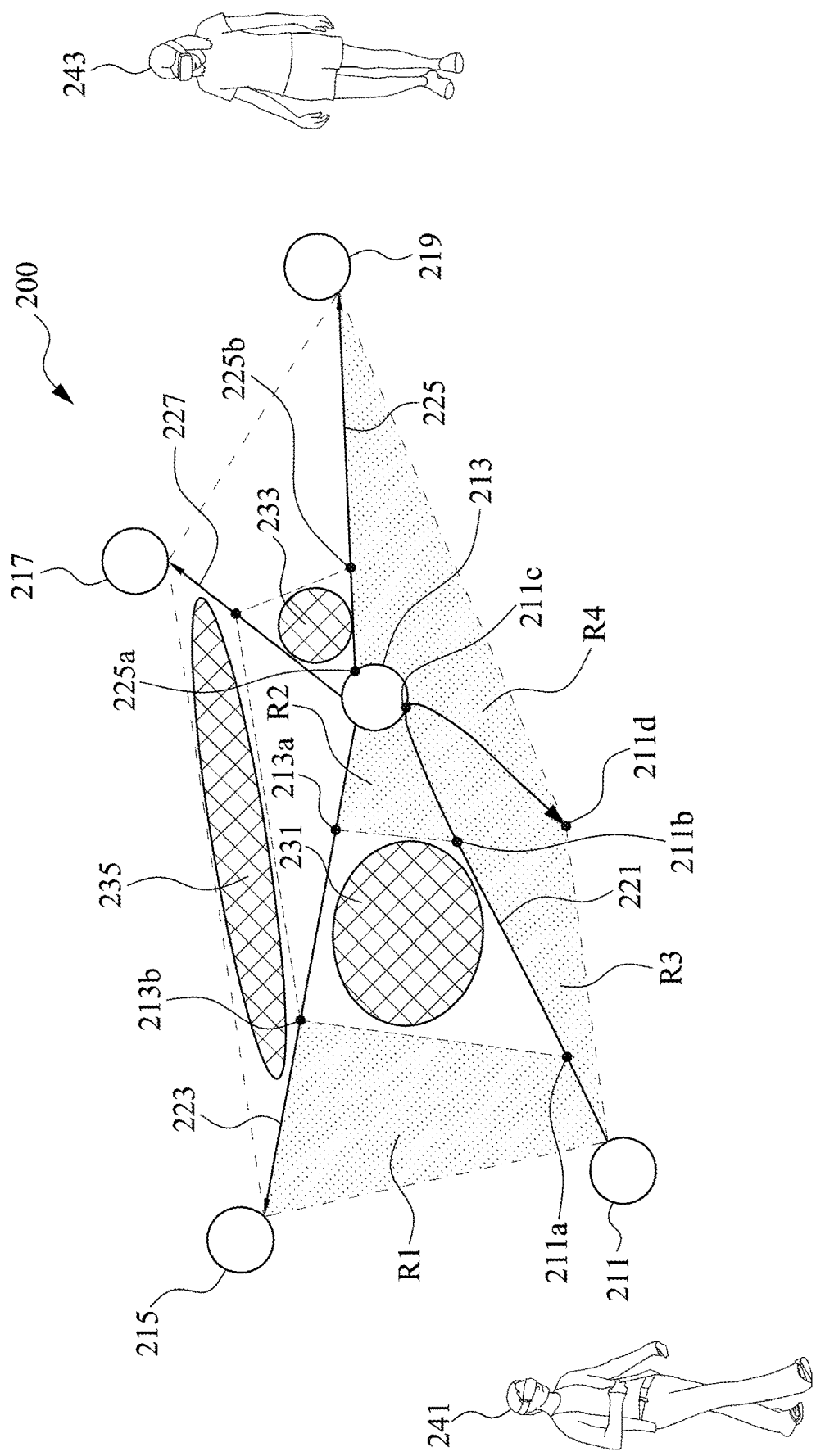
FIG. 2 is a diagram illustrating a map data of the multimedia interacting system in accordance with some embodiments of the present disclosure.

Please referring to FIG. 2, FIG. 2 is a diagram illustrating a map data 200 of the multimedia interacting system 100 in accordance with some embodiments of the present disclosure. As shown in FIG. 2, the map data 200 includes multiple routes (e.g. route 221, 223, 225, 227), multiple points 211, 211d, 213, 215, 217, 219, and a shelter notation 231, 233, 235. The tour videos are recorded previously along the routes 221, 223, 225, 227. For example, the tour videos are recorded in British Museum along routes including the route from the Main entrance to the Great Court and then turning to the Room 2 (route 221), the route from the Great Court to the East stairs (route 225), the route from the Great Court to the West stairs (route 227), the route from the Great Court to the South stairs (route 223), etc.

Users can choose one video to watch. For example, when the user wants to know how to visit from the Main Gate to the Great Court, the user can choose the respective tour video to watch. It should be noticed that, the user can choose any one of the display device 120a~120n of the multimedia interacting system 100 in FIG. 1. The multiple display devices 120a~120n in the multimedia interacting system 100 can play the same or different tour videos at the same time such that many users can watch videos online simultaneously. For example, a first user 241 watches the chosen tour video by the display device 120a, a second user 243 watches the chosen tour video by the display device 120b, a third user (not shown) watches the chosen tour video by the display device 120n, etc.

There are a shelter notation 231, a shelter notation 233, and a shelter notation 235 in the map data 200. The shelter notation 231 represents that there are obstacles or walls or the like between the route 221 and the route 223. The shelter notation 233 represents that there are obstacles or walls or the like between the route 225 and the route 227. The shelter notation 235 represents that there are obstacles or walls or the like between the route 227 and the route 223.

For example, in a first tour video chosen by the user, the scene along point 211, point 211a, point 211b, point 211c and point 211d sequentially in route 221 can be watched. The point 211, point 211a, point 211b, point 211c, and point 211d are respectively corresponding to the time 0 minute 0 second, 2 minutes 50 seconds, 7 minutes 50 seconds, 10 minutes 0 second, and 12 minutes 50 seconds of the first tour video.

In another tour video, a second tour video, chosen by users, the user can watch the scene sequentially along point 213, point 213a, point 213b, and point 215 in route 223. The point 213, point 213a, point 213b, and point 215 are respectively corresponding to the time 0 minute 0 second, 2 minutes 0 second, 6 minutes 30 seconds, and 9 minutes 30 seconds of the second tour video.

In another tour video, a third tour video, chosen by users, the user can watch the scene sequentially along point 225a, point 225b, and point 219 in route 225. The point 225a, point 225b, and point 219 are respectively corresponding to the time 0 minute 0 second, 3 minutes 30 seconds, and 8 minutes 40 seconds of the third tour video.

In one embodiment, when the first user 241 is watching the first tour video (route 221), and, at the same time, the second user 243 is watching the second tour video (route 223). In some situation, the first user 241 may watch an avatar, a movement of the avatar and/or the sound of users or the like of the second user 243 in the first tour video, and vice versa. That is, when there is not obstacle between the route 221 and the route 223, the first user 241 and the second user 243 can see the avatar of the opposite user in the tour video each other. For example, when the first user 241 watches the first tour video and the second user 243 watches the second tour video, and the first tour video is played at 8 minutes 32 seconds (between the point 211b and the point 211c) and the second tour video is played at 0 minute 50 seconds (between the point 213 and the point 213a), the first user 241 and the second user 243 can see the avatar, a movement of the avatar and/or the sound of users or the like of the opposite users because there is not shelter between the route 221 and the route 223 (such as a region R2 shown in FIG. 2).

In one embodiment, when the first user 241 watches the first tour video and the second user 243 watches the second tour video, and the first tour video is played at 5 minutes 15 seconds (between the point 211a and the point 211b) and the second tour video is played at 5 minutes 30 seconds (between the point 213a and point 213b), the first user 241 and second user 243 cannot see the avatar, a movement of the avatar and/or the sound of users or the like of the opposite users because there is shelter between the route 221 and the route 223 (such as a shelter notation 231 shown in FIG. 2).

Figure 3:
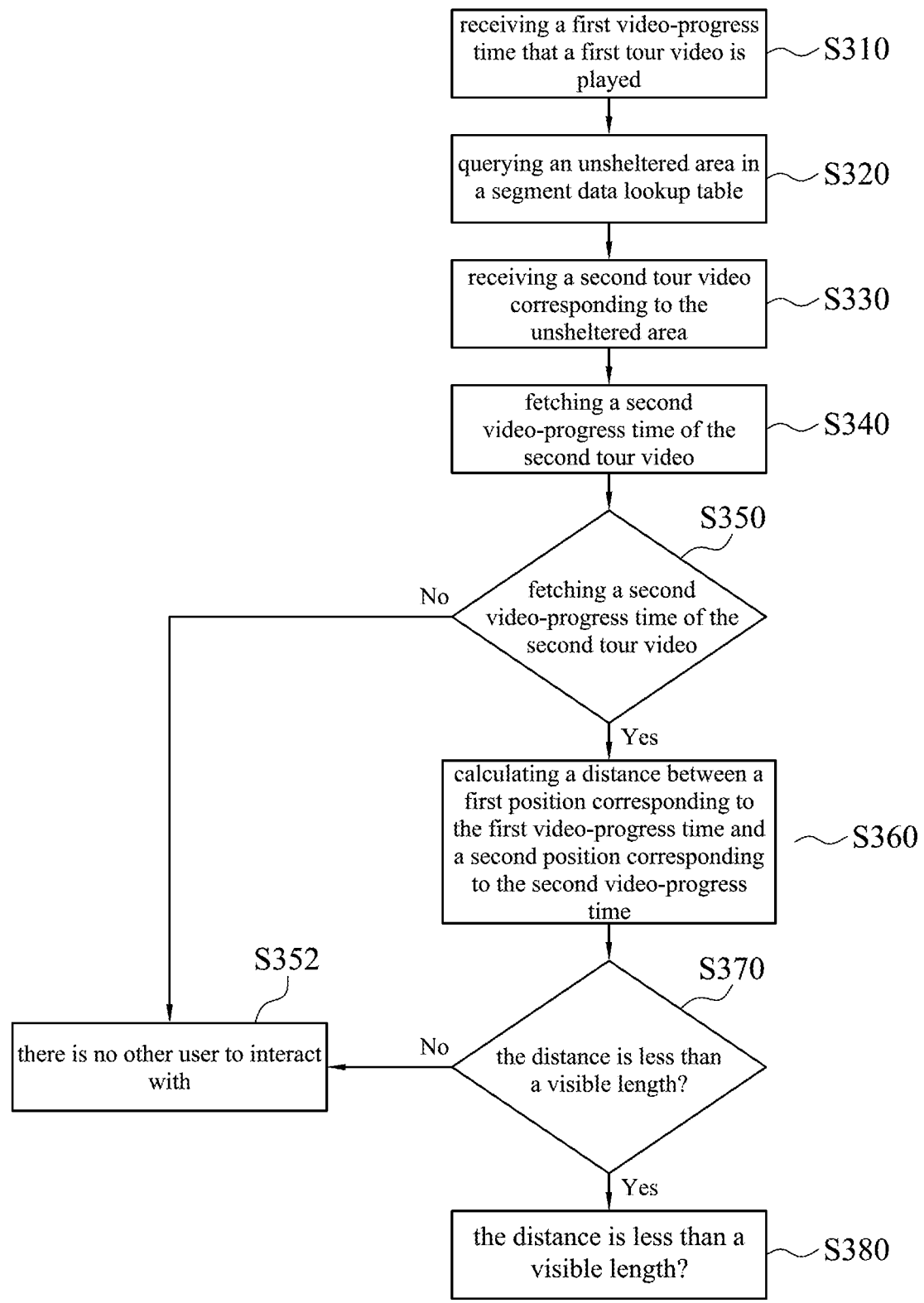
FIG. 3 is a flowchart illustrating a multimedia interacting method in accordance with some embodiments of the present disclosure.

Please referring to FIG. 3, FIG. 3 is a flowchart illustrating a multimedia interacting method in accordance with some embodiments of the present disclosure. The multimedia interacting method of the disclosed subject matter is suitable for the multimedia interacting system 100 shown in FIG. 1. The following statements take the multimedia interacting system 100 shown in FIG. 1 and the map data 200 shown in FIG. 2 as example, but the topology in the present disclosure not limited in the map data 200. In step S310, the first user 241, using the display device 120a, watches the first tour video. During displaying process, the server 110 fetches the first video-playing time (such as the time point at 8 minutes 32 seconds) that the display device 120a is currently displaying videos, that is, the video time of timeline that the first tour video is being played by the display device 120a. In step S320, the server 110 queries an unsheltered area in a segment data lookup table, the segment data lookup table is shown as Table 1. The server 110 fetches the time point of a first video-playing time to query another scene positions in videos by the time that another scene positions may be seen by users which are at the scene position of the first video-playing time. For example, there are unsheltered areas R1, R2, R3, and R4 corresponding to the first tour video (Video 1). When the first video-playing time, 8 minutes 32 seconds, is at a first duration which starts at 7 minutes 50 seconds and ends at 10 minutes 0 seconds. The first duration is corresponding to the unsheltered area R2.

TABLE 1 the segment data lookup table

| unsheltered area | tour video | first duration start | first duration end | tour video | second duration start | second duration end |
|---|---|---|---|---|---|---|
| R1 | Video 1 | 0:00 | 2:50 | Video 4 | 9:30 | 6:30 |
| R2 | Video 1 | 7:50 | 10:00 | Video 4 | 2:00 | 0:00 |
| R3 | Video 1 | 0:00 | 10:00 | Video 1 | 10:00 | 12:50 |
| R4 | Video 1 | 0:00 | 12:50 | Video 2 | 0:00 | 8:40 |
| R4 | Video 2 | 0:00 | 8:40 | Video 1 | 10:00 | 12:50 |
| R5 | Video 2 | 3:30 | 8:40 | Video 3 | 4:00 | 6:20 |
| R6 | Video 3 | 0:00 | 4:00 | Video 4 | 0:00 | 6:30 |
| R5 | Video 3 | 4:00 | 6:20 | Video 2 | 3:30 | 8:40 |
| R2 | Video 4 | 0:00 | 2:00 | Video 1 | 10:00 | 7:50 |
| R6 | Video 4 | 0:00 | 6:30 | Video 3 | 0:00 | 4:00 |
| R1 | Video 4 | 6:30 | 9:30 | Video 1 | 2:50 | 0:00 |

In step S330, the server 110 receives, according to the obtained unsheltered area, the second tour video corresponding to the unsheltered area in the segment data lookup table. For example, by querying table 1 according to the unsheltered area R2, a second tour video (Video 4) is also corresponding to the unsheltered area R2.

In step S340, in one embodiment, the second user 243, using the display device 120b, watches the second tour video (such as Video 4). During displaying process, the server 110 fetches the second video-playing time (e.g. the time point at 2 minutes 50 seconds), that is, the video time that the display device 120b is currently displaying the second tour video.

In step S350, the server 110 determines whether the second video-playing time is in the second duration. If the second video-playing time is not in the second duration, in step S352, the server 110 decides that there is no other user to interact with the first user 241.

If the second video-playing time is in the second duration, in step S360, the server 110 calculates a distance between a first position corresponding to the first video-playing time and a second position corresponding to the second video-playing time. For example, the video time at point 211, 211a, 211b, 211c of the first tour video are respectively 0 minutes 0 seconds, 2 minutes 50 seconds, 7 minutes 50 seconds, and 10 minutes 0 seconds. The video length from point 211 to point 211c is 10 minutes 0 second. When the first video-playing time is at 8 minutes 32 seconds, the video length from 8 minutes 32 seconds to 10 minutes 0 second is 1 minute 28 seconds (i.e. 10:00-8:32, the length between 10 minutes 0 second and 8 minutes 32 seconds). There is a virtual length L from point 211 to point 211c (or a scene distance previously measured). The distance between a virtual position at the first video-playing time and the virtual position of the point 211c is $$\frac{10:00 - 8:32}{10:00} \times L.$$

In one embodiment, the tour videos are captured by a camera with a fixed moving speed. Therefore, the length L of the camera in the route can be calculated according to the moving speed of the camera and the film time. In another embodiment, an IMU (International Mathematical Union, IMU) is disposed on the camera, the length L of the route can be measured by the measuring data of the IMU while the camera moves and generate films.

In step S370, the server 110 determines whether the calculated distance is less than a visible length or not. The visible length is a total length of a first field of view, for the display device 120a showing the interactive data, and a second field of view, for the display device 120b showing the interactive data.

Figure 4:
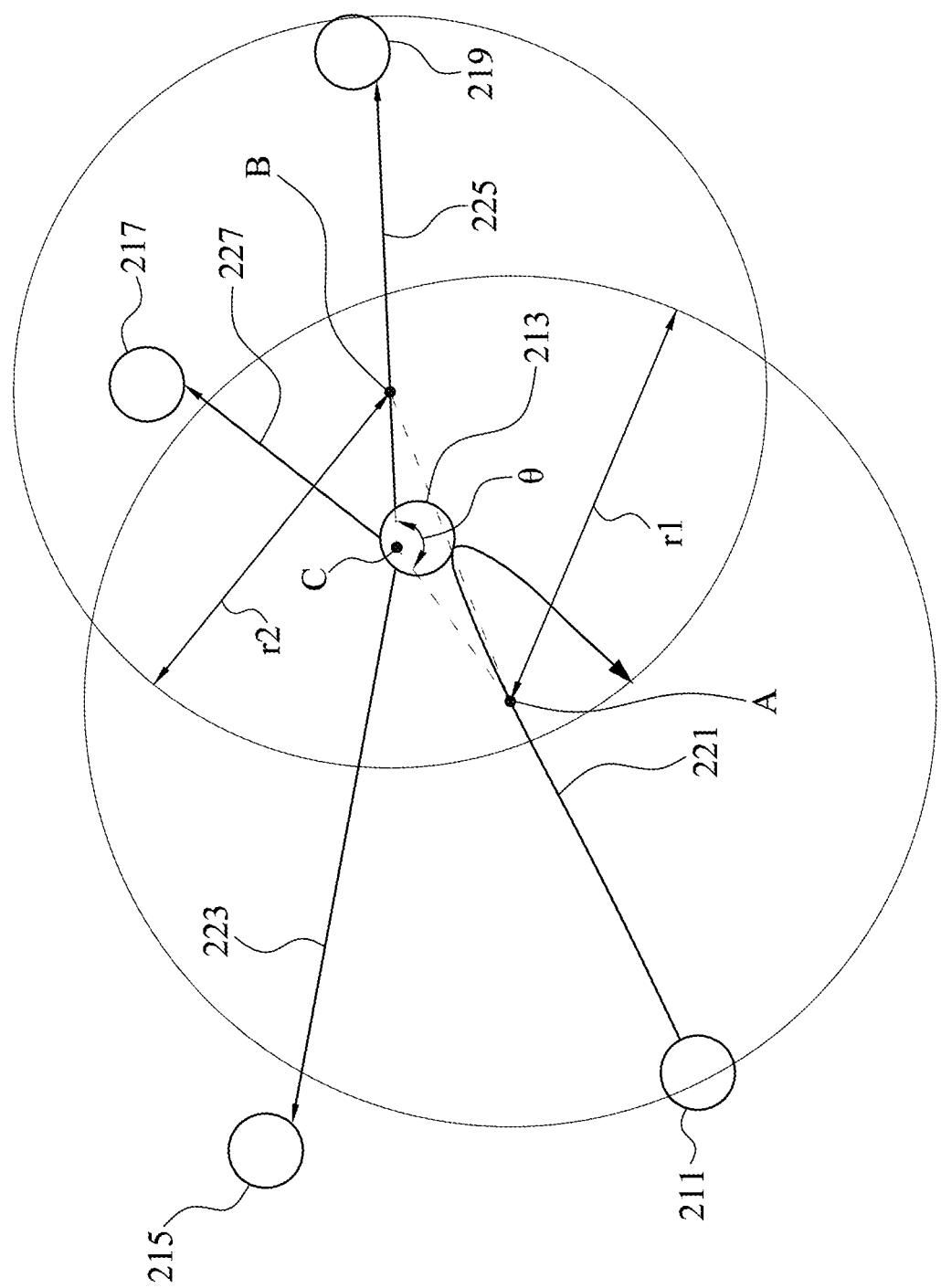
FIG. 4 is a diagram illustrating an interacting range between users of the multimedia interacting system in accordance with some embodiments of the present disclosure.

Please referring to FIG. 4, FIG. 4 is a diagram illustrating an interacting range between users of the multimedia interacting system 100 in accordance with some embodiments of the present disclosure. The first tour video is being played and the scene is at point A, and the display device 120a has a first field of view with length r1 showing an interactive data. The second tour video is being played and the scene is at point B, and the display device 120b has a second field of view with length r2 showing the interactive data. It should be noted that, the length of the first field of view r1 and the length of the second field of view r2 can be set in advance. The server 110 calculates the distance between the point A and the point B, that is, $\overline{AB}=\sqrt{\overline{AC}^2+\overline{BC}^2-2(\overline{AC})(\overline{BC})\cos\theta}$. The visible length is the total length between the length of the first field of view r1 and the length of the second field of view r2.

Back to FIG. 3, if the distance $\overline{AB}$ is less than or equal to the visible length r1+r2, in step S380, the server 110 transmits the interactive data to the display device 120a and the display device 120b. The interactive data can be but not limited to the augmented reality avatar objects shown on the display device 120a, 120b. For example, the first user 241 can see the virtual avatar, the movement of the avatar and/or the sound of the second user 243 in the first tour video, vice versa. The operation or movement information of the first user 241 can be retrieved by sensors (not shown), a microphone (not shown) or other means, and the second user 243 can see the movement of the avatar of the first user 241 (such as waving hands) through the display device 120b or hear the sound of first user 241 through a speaker (not shown). Similarly, the operations or movement information of the second user 243 can be also transmitted to the display device 120a through the server 110. Therefore, the first user 241 and the second user 243 can interact with each other through the display device 120a, 120b.

If the distance $\overline{AB}$ is more than the visible length r1+r2, back to the step S352, the server 110 decides that there is no another users for the first user 241 to interact with.

In one embodiment, the display device 120a~120n or the host device communicated with the display device 120a~120n query the segment data lookup table so that the multimedia interacting method can be performed.

Figure 5:
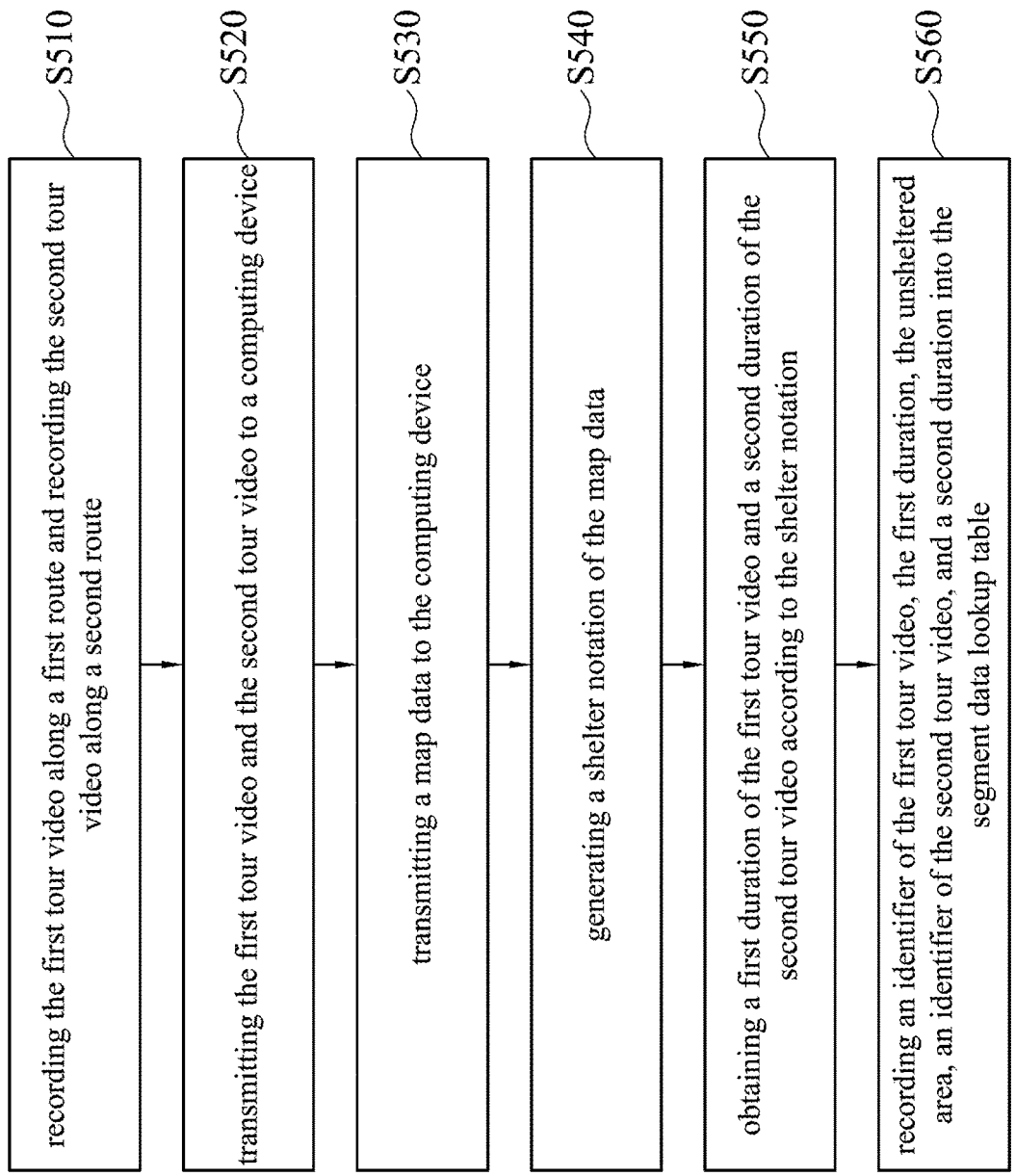
FIG. 5 is a flowchart illustrating to generate a segment data lookup table in accordance with some embodiments of the present disclosure.

Please referring to FIG. 5, FIG. 5 is a flowchart illustrating to generate a segment data lookup table in accordance with some embodiments of the present disclosure. As shown in FIG. 5, in step S510, the camera records the first tour video along the first route (e.g. route 221 in FIG. 2) and records the second tour video along the second route (e.g. route 223 in FIG. 2). The camera may be but not limited to speed dome camera). The tour video can be but not limited to 360 degrees Panoramic View images. In step S520, the recorded multiple tour videos are transmitted to a computing device (not shown in FIG. 1). The computing device may be but not limited to an electronic device configured with image processors. In one embodiment, the computing device executes image comparing technique to fetch a starting time and an end time of each tour video in order to calculate the space relation among the tour videos. For example, please referring to Table 1, the image of the end of the Video 1 is similar with the image, horizontal angle image (e.g. images captured at 180 degrees angle of view by the dome camera), of the starting time of the Video 2, the Video 3, and the Video 4 respectively. Therefore, the computing device stores associatively the end time of the Video 1 and the starting time of Video 2, Video 3, and Video 4. Hence, the map data 200 in FIG. 2 can be built by re space relation of videos and the length of each route.

Then, in step S530 further proceed to transmit the map data to the computing device. In step S540, the computing device generates a shelter notation of the map data. In one embodiment, the sheltered area is noted manually by map data maintainer, or executing the image comparing algorithm by the computing device to compute the images similarity. When the similarity is less than a threshold, it is determined that there is a shelter between some specific position in routes. The image similarity algorithm can be but not limited to the feature matching algorithm, the color histogram algorithm, the mutual information algorithm, the machine learning algorithm, etc. In one embodiment, when images of the tour video are at different angles, images at other angles of another tour video will be compared with each other for image similarities. For example, when the similar parameter, between the image at 0 degree of the first tour video and the image at degree 180 of the second tour video, is more than the threshold, the image angles have the corresponding relation between the two tour videos. On the other hand, the image at 180 degree of the first tour video and the image at 220 degree of the second tour video, when the similarity parameter of the two images is more than the threshold, the image angles have corresponding relation between the two tour videos. Hence, when there is corresponding relation between images of the tour video, it can be determined that there is no shelter between the positions of the tour videos.

In step S550, the computing device eliminates, according to the shelter notation, the relation between the tour video to obtain a first duration of the first tour video and a second duration of the second tour video. For example, while building the relation between the tour video, Video 1, and the tour video, Video 4, because there is the shelter notation between the point 211a and the point 211b in the route 211 of the tour video (Video 1), and there is the shelter notation between the point 213a to the point 213b in the route 223 of the tour video (Video 4), the computing device records that there is a correspondence relation between the point 211 to the point 211a of the tour video (Video 1) and the point 213b and the point 215 of the tour video (Video 4) (i.e. the unsheltered area R1). Similarly, the computing device records that there is a correspondence relation between the point 211b and the point 211c of the tour video (Video 1) and the point 213 to the point 213a of the tour video (Video 4) (i.e. the unsheltered area R2).

In step S560, an identifier of the first tour video, the first duration of the first tour video, the unsheltered area, an identifier of the second tour video and a second duration of the second tour video are recorded in the segment data lookup table. For example, the first column shown in Table 1 stores the unsheltered area R1, the identifier of the tour video (Video 1), the first duration, the identifier of the tour video (Video 4), and the second duration.

As states above, the multimedia interacting system 100 and the multimedia interacting method in the present disclosure provide uses to watch the tour video and interact with other users watching the tour videos. Users can realize the real environment by watching the tour videos. For making the users more familiar with the real environment, the present disclosure applies the image identification techniques and augmented reality techniques, while watching tour videos, it is possible for users to see other users who is at other scene positions and interact with other users, such as waving hands, asking their positions, exchanging location information, sharing experiences, etc. Users can realize the scenes of videos faster, and it is more real while watching the tour videos and with more fun. In addition, it can be confirmed quickly by the server whether there is enough virtual space for users to interact with each other. By using the segment data lookup table, unnecessary information can be removed and the virtual distance between users can be calculated by the virtual position of users. When the virtual interacting range is set by each user, users whose locations have intersections can interact with each other. Hence, the server will not have to deal with unnecessary computing data, and the bandwidth resource consumption can be decreased.

Although the present disclosure has been described in considerable detail with reference to certain embodiments thereof, other embodiments are possible. Therefore, the scope of the appended claims should not be limited to the description of the embodiments contained herein.

What is claimed is:

1. A multimedia interacting system, comprising:
   a first display device and a second display device;
   a server configured to communicate with the first display device and the second display device, wherein the server is configured to:
   receive a first video-playing time that the first display device plays a first tour video;
   obtain an unsheltered area associated with the first tour video according to the first video-playing time;
   obtain a second tour video corresponding to the unsheltered area; and
   transmit an interactive data to the first display device and the second display device when the second display device plays the second tour video.

2. The system of claim 1, wherein the interactive data comprises a first object corresponding to the first display device and a second object corresponding to the second display device, wherein the server is configured to transmit the first object and the second object to the first display device and the second display device respectively, wherein the first display device shows the first tour video having the second object, and the second display device shows the second tour video having the first object.

3. The system of claim 2, wherein when a first operation is executed by the first object and the first operation is transmitted to the second display device by the server, the first operation of the first object is displayed by the second display device, and when a second operation is executed by the second object and the second operation is transmitted to the first display device by the server, the second operation of the second object is displayed by the first display device.

4. The system of claim 1, wherein the server stores a segment data lookup table, wherein the segment data lookup table stores the first tour video, the unsheltered area corresponding to the first tour video, and the second tour video corresponding to the unsheltered area.

5. The system of claim 4, wherein the server is further configured to query the segment data lookup table and obtain the unsheltered area when the first video-playing time is in a first duration of the first tour video.

6. The system of claim 5, wherein the server is further configured to:
  obtain a second video-playing time when the second display device is playing the second tour video;
  query the segment data lookup table and determine whether the second video-playing time is in a second duration of the second tour video; and
  calculate a distance between a first position of the first tour video and a second position of the second tour video when the second video-playing time is in the second duration, wherein the first position is corresponding to the first video-playing time and the second position is corresponding to the second video-playing time.

7. The system of claim 6, wherein the server is further configured to determine whether the distance is less than a visible length, and the server transmits the interactive data to the first display device and the second display device when the distance is less than the visible length, wherein the visible length is a total length of a first field of view, for the first display device showing the interactive data, and a second field of view, for the second display device showing the interactive data.

8. The system of claim 7, wherein the server is further configured to store a map data, the map data comprises a first route and a second route, wherein the first tour video is generated, by a camera, along the first route, and the second tour video is generated, by the camera, along the second route.

9. The system of claim 8, wherein the map data is further comprises a shelter notation, wherein the shelter notation is between a part of the first route and a part of the second route.

10. The system of claim 9, wherein the server is further configured to:
  read the first duration of the first tour video excluding the shelter notation in the first route, and read the second duration of the second tour video excluding the shelter notation in the second route; and
  store associatively an identifier of the first tour video, the first duration of the first tour video, the unsheltered area excluding the shelter notation, an identifier of the second tour video and the second duration of the second tour video in the segment data lookup table.

11. A multimedia interacting method, comprising:
  receiving a first video-playing time that a first tour video is played by a first display device;
  obtaining an unsheltered area associated with the first tour video according to the first video-playing time;
  obtaining a second tour video corresponding to the unsheltered area; and
  transmitting an interactive data to the first display device and the second display device when the second display device plays the second tour video.

12. The method of claim 11, wherein the interactive data comprises a first object corresponding to the first display device and a second object corresponding to the second display device, wherein the method further comprises transmitting the first object and the second object to the first display device and the second display device respectively, and showing the first tour video having the second object by the first display device and showing the second tour video having the first object by the second display device.

13. The method of claim 12, further comprising displaying the first operation of the first object by the second display device when the first object executes a first operation and the first operation is transmitted to the second display device by the server, and displaying the second operation of the second object by the first display device when the second object executes a second operation and the second operation is transmitted to first display device by the server.

14. The method of claim 11, wherein a segment data lookup table stores the first tour video, the unsheltered area corresponding to the first tour video, and the second tour video corresponding to the unsheltered area.

15. The method of claim 14, further comprising querying the segment data lookup table and obtaining the unsheltered area when the first video-playing time is in a first duration of the first tour video.

16. The method of claim 15, further comprising:
  obtaining a second video-playing time when the second tour video is being played by the second display device;
  querying the segment data lookup table to determine whether the second video-playing time is in a second duration of the second tour video; and
  calculating a distance between a first position of the first tour video and a second position of the second tour video when the second video-playing time is in the second duration, wherein the first position is corresponding to the first video-playing time and the second position is corresponding to the second video-playing time.

17. The method of claim 16, further comprising determining whether the distance is less than a visible length, and transmitting the interactive data to the first display device and the second display device when the distance is less than the visible length, wherein the visible length is a total length of a first field of view, for the first display device showing the interactive data, and a second field of view, for the second display device showing the interactive data.

18. The method of claim 17, further comprising storing a map data, the map data comprises a first route and a second route, wherein the first tour video is generated, by a camera, along the first route, and the second tour video is generated, by the camera, along the second route.

19. The method of claim 18, wherein the map data further comprises a shelter notation, wherein the shelter notation is between a part of the first route and a part of the second route.

20. The method of claim 19, further comprising:
  reading the first duration of the first tour video excluding the shelter notation in the first route, and reading the second duration of the second tour video excluding the shelter notation in the second route; and storing associatively an identifier of the first tour video, the first duration of the first tour video, the unsheltered area excluding the shelter notation, an identifier of the second tour video and the second duration of the second tour video in the segment data lookup table.

\* \* \* \* \*